United States Patent
LeComte et al.

[11] Patent Number: 5,935,547
[45] Date of Patent: *Aug. 10, 1999

[54] PROCESS FOR TREATING GAS CONTAINING HYDROGEN SULFIDE AND SULPHUR DIOXIDE, COMPRISING A STEP FOR DEPLETING THE RECYCLED SOLVENT IN SULPHUR

[75] Inventors: Fabrice LeComte, Vincennes; Claude Dezael, Maisons Laffitte; Jean-Charles Viltard, Valence, all of France

[73] Assignee: Institut Français Du Pétrole, France

[*] Notice: This patent is subject to a terminal disclaimer.

[21] Appl. No.: 08/929,445

[22] Filed: Sep. 16, 1997

[30] Foreign Application Priority Data

Sep. 16, 1996 [FR] France ................... 96 11409

[51] Int. Cl.$^6$ ............... B01D 53/50; B01D 53/52
[52] U.S. Cl. ............ 423/575; 423/574.1; 423/576.2; 423/242.2
[58] Field of Search .............. 423/575, 574.1, 423/242.2, 576.2, 222, 226; 95/235

[56] References Cited

U.S. PATENT DOCUMENTS

| | | | |
|---|---|---|---|
| 2,881,047 | 4/1959 | Townsend | 423/575 |
| 3,598,529 | 8/1971 | Deschamps et al. | 23/225 R |
| 3,796,796 | 3/1974 | Deschamps et al. | 423/575 |
| 3,832,454 | 8/1974 | Renault et al. | 423/574 |

FOREIGN PATENT DOCUMENTS

| | | |
|---|---|---|
| 2 122 674 | 9/1972 | France . |
| 2 411 802 | 7/1979 | France . |
| 51-16187 | 5/1976 | Japan ..................... 423/226 |
| 1223732 | 8/1971 | United Kingdom ........... 423/576.7 |
| 2 012 806 | 8/1979 | United Kingdom . |

*Primary Examiner*—Gary P. Straub
*Assistant Examiner*—Timothy C Vanoy
*Attorney, Agent, or Firm*—Millen, White, Zelano, & Branigan, P.C.

[57] ABSTRACT

In a process for treating a gas containing hydrogen sulphide and sulphur dioxide, such as Claus plant tail gas, to substantially reduce emission of sulphur vapor in the treated gases, the process a characterized in that the gas is brought into contact with a solvent (5) in at least one gas-liquid reactor-contactor (2) and a gas (20) is recovered which is sent to a second reactor (102) where it is brought into contact with solvent (105), the solvent (105) being cooled by suitable means (190), to separate a portion of the sulphur from the solvent. The resultant solvent depleted in sulphur, contacts the gas (20) from the first reactor (2). The gas (120) from the second reactor is highly depleted in sulphur vapor. At least one of the reactors contains a catalyst. The solvent may be insoluble in water, e.g. dodecane, tridecane, naphtha, or soluble in water, e.g. glycerol, thiodiglycol, cyclohexanedimethylethanol, or an acid ester. The catalyst may comprise, e.g., alkaline salts of organic acids such as benzoic acid or salicylic acid.

16 Claims, 2 Drawing Sheets

PROCESS FOR TREATING GAS CONTAINING HYDROGEN SULFIDE AND SULPHUR DIOXIDE, COMPRISING A STEP FOR DEPLETING THE RECYCLED SOLVENT IN SULPHUR

BACKGROUND OF THE INVENTION

1. Field of the Invention

The present invention concerns a process and apparatus for treating a gaseous effluent from a Claus plant or a gas containing hydrogen sulphide and sulphur dioxide.

In particular, it concerns the treatment of effluents from Claus plants from hydrodesulphurization and catalytic cracking units. It also concerns the purification treatment of natural gas.

2. Description of the Prior Art

The prior art is illustrated by French patent application FR-A-2 411 802.

The Claus process is widely used to recover elemental sulphur from gaseous feeds containing hydrogen sulphide ($H_2S$). However, the fumes emitted from these Claus type plants, even after several catalytic stages, contain non negligible amounts of acid gases. Those effluents (tail gases) from Claus plants must, therefore, be treated to eliminate the majority of toxic compounds so as to satisfy anti-pollution regulations. These regulations are becoming more and more strict and existing technology must be constantly improved.

As an example, about 95% by weight of the sulphur present can be recovered from a Claus plant; treatment of this Claus plant tail gas (using a Clauspol unit, for example) can recover 99.8% by weight of the sulphur, for example, using the reaction:

$$2H_2S + SO_2 \rightarrow 3S + 2H_2O$$

which uses a reaction medium constituted by an organic solvent and a catalyst comprising an alkaline or alkaline-earth salt of an organic acid. The reaction is generally carried out in counter-current mode in a reactor-contactor and its temperature is controlled by passing the solvent which is extracted from the lower end of the reactor by a circulating pump through a heat exchanger to encourage the highest possible degree of conversion to sulphur while avoiding the formation of solid sulphur. Sulphur is thus recovered in liquid form. While it is very effective, the process is limited by various constraints:

The thermodynamic equilibrium of the reaction is such that the reaction is never complete. Some hydrogen sulphide and sulphur dioxide remains, in equilibrium with the sulphur and water which are formed. The quantity of sulphur present in unreacted $H_2S$ and $SO_2$ which is found in the reaction effluent (from the Clauspol) corresponds to about 0.1% of the total sulphur in the initial feed to the Claus plant. Better conversion can be envisaged at a lower operating temperature but this temperature must be kept above the freezing point of sulphur (about 120° C.) otherwise the reactor will be blocked with solid sulphur;

The presence of unseparated liquid sulphur in the reactor-contactor, which is entrained in the solvent and catalyst which circulate, and which is recycled to the reactor-contactor. Not all of the droplets of liquid sulphur are separated from the solvent and the presence of liquid sulphur irremediably causes the presence of gaseous sulphur in the effluent due to the vapour pressure of sulphur. As an example, the quantity of unrecovered sulphur which can be attributed to vapour pressure is about 0.1% by weight of the sulphur in the initial feed.

SUMMARY OF THE INVENTION

The aim of the invention is to overcome the disadvantages of the prior art.

A further aim of the invention is to satisfy the strictest regulations designed to counter atmospheric pollution by sulphur-containing compounds.

A yet still further aim of the invention is to be able to modify existing installations with a Claus plant and a unit for treating the effluents from that unit (a Clauspol unit), at very low cost.

It has been shown that by eliminating all of the sulphur vapour from the effluents from gas treatment units, for example Claus plant tail gas, up to 99.9% of the total sulphur can be recovered and thus the quantity of sulphur discharged into the atmosphere when the gas is incinerated can be minimised.

More precisely, the invention concerns a process for the treatment of a gas containing hydrogen sulphide and sulphur dioxide, in which the gas is brought into contact with an organic solvent containing a catalyst in at least one gas-liquid reactor-contactor at a suitable temperature, and a gaseous effluent which substantially no longer contains hydrogen sulphide and sulphur dioxide but which contains sulphur in vapour form is recovered, the process being characterized in that the gaseous effluent from the reactor-contactor is brought into contact with the same organic solvent or with another organic solvent at a temperature which is lower than the solidification temperature of sulphur (for example 95° C.) in a contactor-cooler.

We have observed that bringing an organic solvent which is partially depleted in sulphur into contact with a gaseous feed from which a portion of the $H_2S$ and $SO_2$ has been removed has produced very good results.

In more detail, the invention concerns a process for the treatment of a gas containing hydrogen sulphide and sulphur dioxide in which the gas (3) is brought into contact with at least one organic solvent in a first gas-liquid contact and reaction zone at a suitable temperature and an effluent containing water and sulphur vapour is recovered separately from an effluent containing sulphur, the process being characterized in that the gaseous effluent is introduced into a second contact zone, and brought into contact under suitable conditions with at least one recycled organic solvent which is depleted in sulphur, a purified gas substantially no longer containing sulphur vapour is recovered separately from said solvent which is rich in sulphur, at least a portion of said sulphur-rich solvent is removed, advantageously at most 50% of the flow, said portion of solvent is cooled to obtain a suspension of sulphur crystals in the solvent, the sulphur crystals are separated from the solvent and said portion of cooled solvent which is depleted in sulphur is recycled at least in part to the second contact zone, the process being further characterized in that at least one of the two contact zones contains at least one catalyst.

In accordance with one characteristic of the invention, the remaining portion of the sulphur-rich organic solvent from the second contact zone is recycled to the second contact zone, more precisely to its upper portion, after optional cooling.

In a further characteristic of the process, the portion of solvent which is to be depleted in sulphur is cooled by indirect heat exchange or by mixing with a suitable quantity of water or by a combination of these means at a temperature which is generally less than the melting temperature of sulphur, preferably at a temperature which is in the range 40° C. to 110° C. The quantity of water which is advantageously introduced is such that a solvent/water mixture containing 30% to 70% by weight of water is obtained.

The sulphur depletion operation consists of removing at least a portion of the sulphur-enriched organic solvent, generally at most 50% of the flow leaving the second contact zone and preferably 2% to 10% of the flow of liquid phase, and cooling it to a temperature such that a suspension of sulphur crystals is obtained in the solvent saturated in sulphur at said cooling temperature. After separating the sulphur crystals, the solvent which is depleted in sulphur with respect to that present in the second reactor-contactor can be re-heated to the temperature of the second reactor-contactor before being introduced into it.

At least a portion of a single-phase solution of said organic solvent can be extracted from the lower portion of the first contact zone, cooled to eliminate at least a portion of the heat of reaction released, then recycled to the first contact zone.

The temperature of the second contact zone is advantageously less than that of the first zone, preferably by 15° C. to 20° C.

It is of great advantage to use the same organic solvent in the first and in the second contact zones. In this case, a solvent line can be connected between the means for recycling the single-phase solution with reduced temperature from the first reactor, and the inlet to the heat exchanger cooling at least a portion of the sulphur-enriched solvent. This line acts as the line for adding solvent to the second reactor-contactor.

The catalyst is preferably introduced into the first reactor-contactor. Thus the majority of the sulphur present in the form of $H_2S$ and $SO_2$ and contained in the gas to be treated is eliminated, the second reactor only providing a finishing treatment which reduces the dimensions of the equipment. Clearly, it can be introduced into the second reactor-contactor alone, or into both.

For vertical reactors, there are two variations of the process of the invention.

In a first variation, both the gas and organic solvent in the first contact zone and the gaseous effluent and organic solvent in the second contact zone are brought into contact in co-current mode, the gas supply or the gaseous effluent supply being made to the upper portion of the contact zones along with the organic solvent supply.

In a second, preferred, variation, both the gas and organic solvent in the first contact zone and the gaseous effluent and organic solvent in the second contact zone are brought into contact in counter-current mode, the gas supply or the gaseous effluent supply being made to the lower portion of the contact zones and the organic solvent supply being made to the upper portion of the contact zones.

Clearly, the process can also be carried out in horizontal reactors.

The invention also concerns an apparatus, shown in FIG. 2 or FIG. 3, for treating a gas containing hydrogen sulphide and sulphur dioxide. It normally comprises a first gas-liquid reactor-contactor (2), means (3) for supplying a gas to be treated and means (5) for supplying an organic solvent, means (25) for recovering sulphur and means (20) for extracting a gaseous effluent containing sulphur in vapour form, the apparatus being characterized in that it comprises a second reactor-contactor (102) connected to the means for extracting the gaseous effluent, means (105) for supplying an organic solvent which is depleted in sulphur connected to the second reactor-contactor, means (120) for recovering a gaseous effluent which has been cleaned of sulphur connected to the second reactor-contactor, means (104) for extracting a liquid phase containing the organic solvent and sulphur connected to the second reactor-contactor, at least one means for depleting at least a portion of the liquid phase in sulphur connected to the means for extracting the liquid phase, comprising at least one means (190) for cooling said phase connected to a means (118) for separating solid sulphur which delivers a solid phase (125) of sulphur at a first end and a liquid phase (121) which is depleted in sulphur at a second end, the second end being connected to the means (105) for supplying solvent depleted in sulphur, the apparatus being further characterized in that at least one of the reactor-contactors contains a catalyst.

When only a portion of the liquid phase containing the organic solvent and sulphur from the second reactor-contactor is cooled to eliminate sulphur, a line connected to the means for extracting said liquid phase can be connected to the means for supplying solvent depleted in sulphur of the second reactor-contactor to recycle the remaining portion of the liquid phase.

It may be of advantage to combine the first reactor-contactor and the second reactor-contactor in the same vessel. However, these two reactor-contactors can be separate.

This is particularly the case when the second reactor-contactor comprises a venturi scrubber type mixer-contactor combined with a separator for separating purified gaseous effluent from the liquid phase, wherein the extraction line is connected to the sulphur depletion means.

The organic solvent can be cooled in different manners:
In a first variation, if the organic solvent is miscible with water, it can be cooled by heat exchange in a heat exchanger before being mixed with the gaseous effluent to be purified, by adding water at a temperature which is lower than that of the organic solvent, wherein the heat of vaporisation on contact with the gaseous effluent can reduce the temperature of the mixture, or by a combination of the above two steps. Cooling is preferably by injection of water.
In a second variation, if the organic solvent is not miscible with water, it can be cooled in the same manner as in the first variation. Cooling is preferably by heat exchange.

The following different types of solvents can be used:
In the category of solvents which are insoluble in water are hydrocarbons with boiling points at atmospheric pressure of more than 200° C., preferably dodecane, tridecane, and naphtha with boiling points in the range 225° C. to 335° C.
In the category of solvents which are soluble in water, with boiling points at atmospheric pressure of more than 200°

C. are polyols containing 2 to 15 carbon atoms, preferably glycerol, thiodiglycol and cyclohexanedimethylethanol, acid esters containing 5 to 15 carbon atoms, more particularly trimethylpentanediol mono-isobutyrate and dimethyl adipate, glycol ethers containing 5 to 15 carbon atoms, advantageously butoxytriglycol, ethoxytriglycol, diethylene glycol butylether, ethylene glycol phenylether, terpinyl ethylene glycol monobenzyl ether, ethylene glycol butylphenylether, diethylene glycol, diethylene glycol dimethylether, diethylene glycol dibutylether, triethylene glycol, tetraethylene glycol dimethylether, propylene n-butylether, dipropylene n-butylether, tripropylene n-butylether, and polyethylene glycol with a molar mass of 200, 300, 400 or 600.

The catalysts and solvents which are generally used are those described, for example, in French patents FR-A-2 115 721 (U.S. Pat. No 3,796,796), FR-A-2 122 674 and FR-A-2 138 371 (U.S. Pat. No. 3,832,454) which are hereby incorporated by reference. More particularly, alkaline salts of organic acids such as benzoic acid and salicylic acid can be used as catalysts.

BRIEF DESCRIPTION OF THE DRAWINGS

The invention will better understood from the following drawings which schematically illustrate a prior art apparatus (FIG. 1) and two variations of an apparatus, in which:

FIG. 3 shows two reactor-contactors in the same vessel.

DETAILED DESCRIPTION OF THE DRAWINGS

Figure 1:
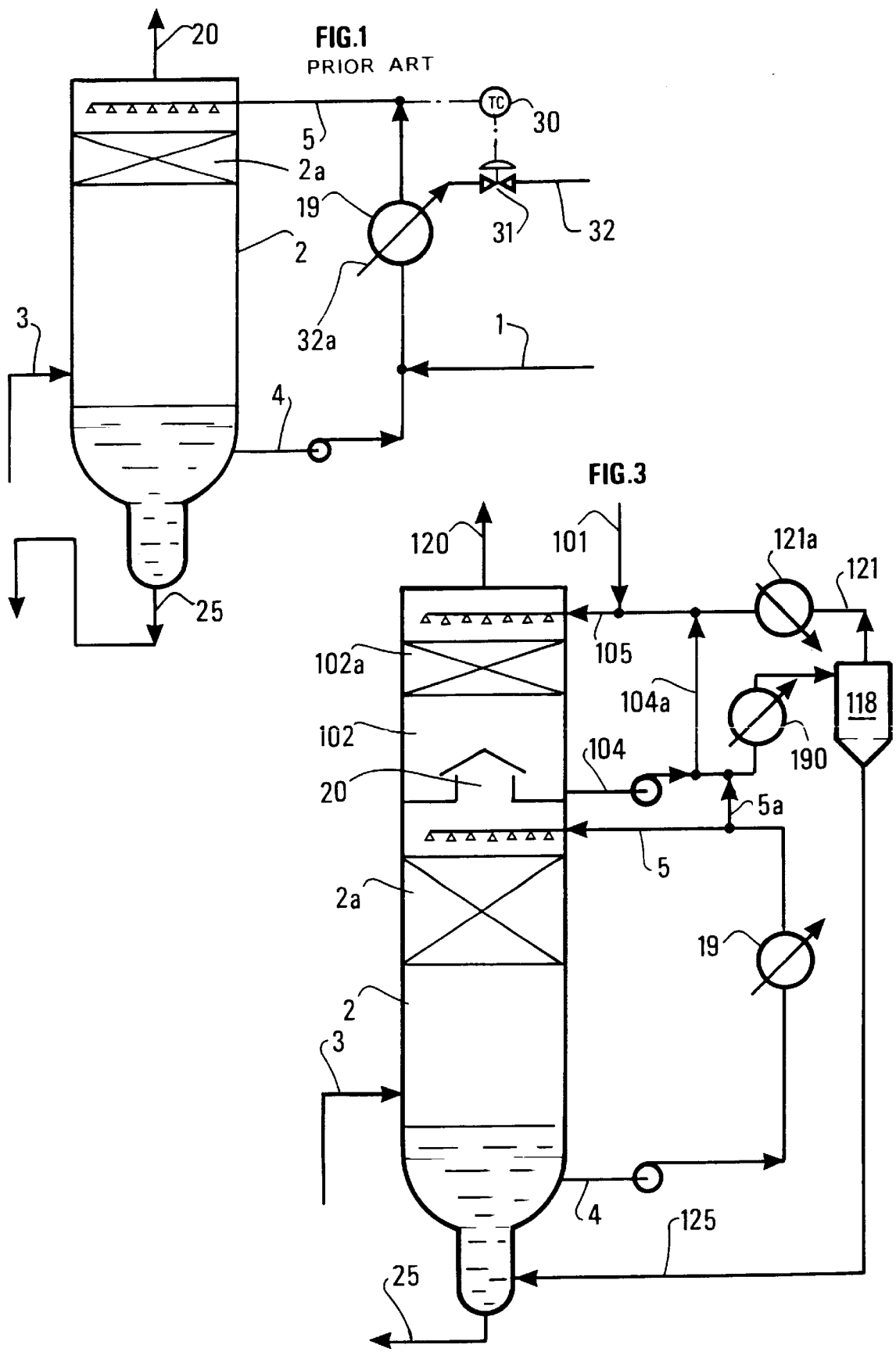

In FIG. 1, the lower portion of a vertical reactor-contactor (2) receives a gas containing $H_2S$ and $SO_2$ via a supply line (3). This reactor comprises a column (2) containing a packing bed (2a) of Intalox saddles, for example, which are capable of retaining the sodium salts formed during the reaction. An organic solvent containing a soluble catalyst supplied via line (1) and originating from a recycle line (4) at the lower portion of reactor-contactor (2) is introduced via a line (5) to the upper portion of the reactor so that the gas to be treated contacts the solvent in counter-current mode. The solvent of line (4) is cooled by a heat exchanger (19) the temperature of which is monitored and regulated by a measuring system (30) associated with a valve (31) located in a line (32) for introducing hot water at about 80° C. This water is evacuated via a line (32a).

Purified gas is extracted overhead from the reactor via a line (20) while the sulphur formed settles to the bottom of the reactor and is extracted via a line (25).

Figure 2:
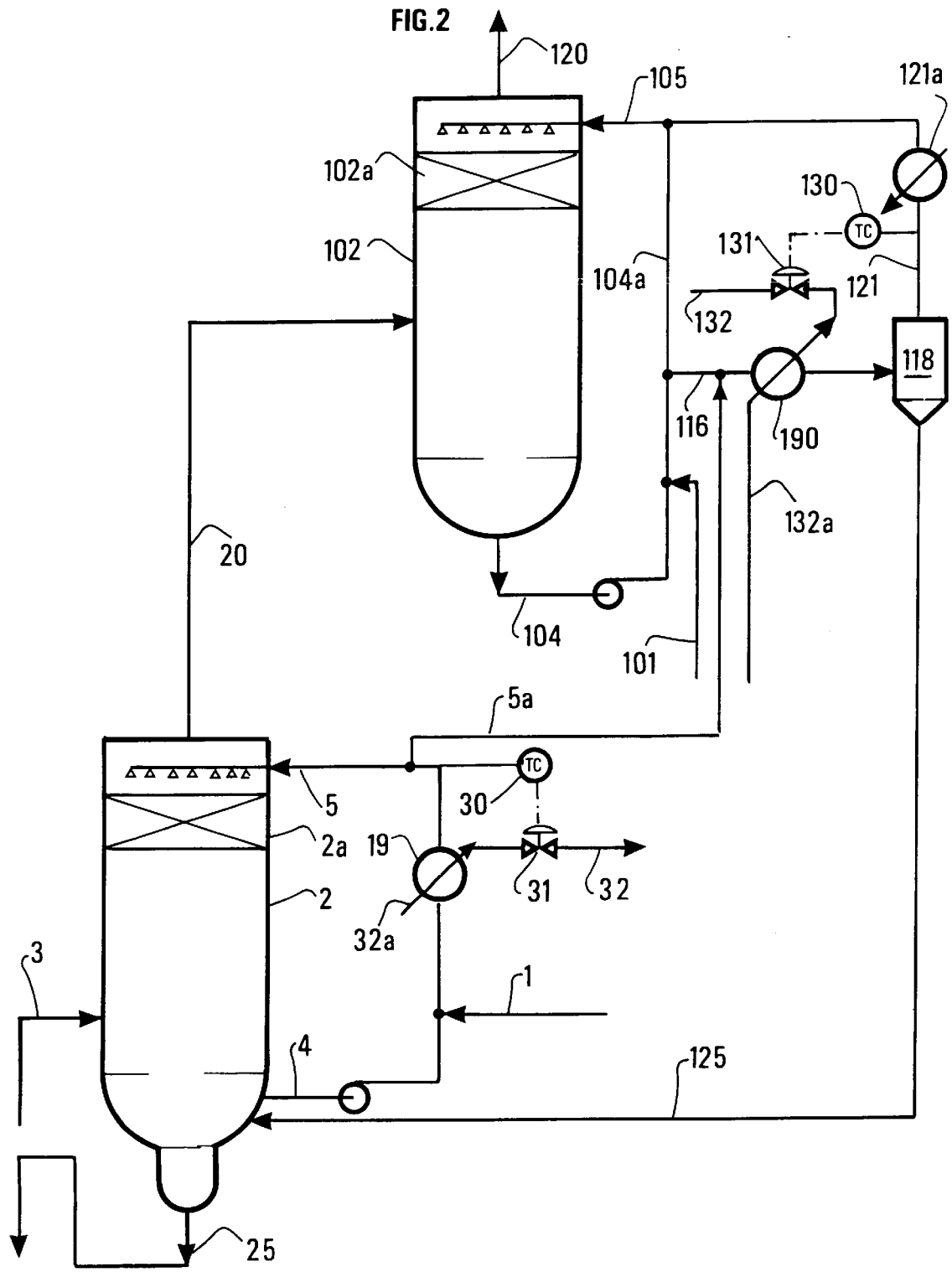
FIG. 2 shows two separate reactor-contactors.

In FIG. 2 which shows one embodiment of an apparatus of the invention, the apparatus comprises two separate vertical reactor-contactors, the first of which is as the description of FIG. 1 with the same reference numerals.

Line (20) recovering the gaseous effluent from the first reactor-contactor (2) supplies the lower portion of a second reactor-contactor (102) comprising a packing bed (102a) which may or may not be identical to the first reactor.

Catalyst supplied via line (101) and organic solvent are introduced via lines (104), (104a) and (105) to the head of the second reactor-contactor which thus carries out gas-liquid contact in the packing in counter-current mode.

A portion, 2% to 10%, for example, of the solvent containing sulphur and catalyst extracted via line (104) is cooled to 60–70° C. by an indirect heat exchanger (190) via a line (116), which crystallises the sulphur and depletes the solvent in sulphur. Heat exchange is effected by injecting water (132) and evacuating (132a) water.

The suspended sulphur is sent to a hydrocyclone (118) where the solvent is separated from the sulphur. At the head of the hydrocyclone, a line (121) on which a further heat exchanger (121a) can optionally be located to reheat the sulphur-depleted solvent, is connected to line (104a), which is also optionally cooled, and their contents are recycled via line (105) above the packing (102a).

A cooling control valve (131) connected to exchanger (190) is associated with a temperature control (130) connected to a temperature probe located upstream of exchanger (121a) in line (121).

Sulphur is recovered from the bottom of hydrocyclone (118) via line (125) and mixed with that from the first reactor-contactor (2) and melted before being extracted via line (25).

Finally, the purified gas is recovered from the head of the second reactor-contactor via a line (120).

When the organic solvent and the catalyst are the same in both reactors, a line (5a) connected to line (5) of the first reactor-contactor can add solvent and catalyst to the second, introducing it to the inlet to exchanger (190).

Clearly, when the solvents in the two reactors are different, this line (5a) is dispensed with and sulphur from hydrocyclone (118) is produced and melted separately via line (125).

In FIG. 3, a vertical reactor-contactor composed of two reaction and contact stages (2 and 102) form the first and second reactor-contactors of FIG. 2, with the exception that:

the first reactor-contactor does not contain catalyst and thus has no catalyst supply line (1) in the solvent line (4);

the gas, partially freed of $H_2S$ and $SO_2$ (20) is introduced directly into the lower portion of the second step (102) by chimney (20) which also recovers solvent, catalyst and sulphur extracted via line (104) to be partially depleted in sulphur by exchanger (190) and hydrocyclone (118).

FIG. 3 includes elements shown in FIG. 2 and, thus, FIG. 3 includes same reference numerals as those of FIG. 2.

The following examples illustrate the invention:

EXAMPLE 1, prior art (FIG. 1)

The characteristics were as follows:

Feed: Claus plant tail gas, flow rate: 12302 $Nm^3/h$;
Reactor temperature: 125° C.;
Packing: ceramic Intalox saddles, specific surface area: 250 $m^2/m^3$;
Solvent: Polyethylene glycol, MW=400, flow rate: 500 $m^3/h$;
Catalyst: sodium salicylate, concentration 100 millimoles per kg of solvent;
Recycled solvent (lines 4 and 5):
Flow rate: 500 $m^3/h$;
Temperature: 123° C.;
Flow rate of sulphur produced (line 25): 315 kg/h.

The compositions of the inlet and outlet gases to and from the plant are shown in Table I below:

TABLE I

|  | Inlet gas (3) vol % | Outlet gas (20) vol % |
|---|---|---|
| $H_2S$ | 1.234 | 0.126 |
| $SO_2$ | 0.617 | 0.063 |
| $CO_2$ | 4.000 | 4.072 |
| COS | 0.015 | 0.009 |
| $CS_2$ | 0.015 | 0.009 |
| $S_v$* | 0.140 | 0.031 |
| $N_2$ | 60.000 | 61.079 |
| $H_2O$ | 34.000 | 34.612 |
| Sum of sulphur-containing compounds | 2.036 | 0.247 |

*$S_v$ = sulphur vapour + vesicular sulphur.

The yield of sulphur-containing compounds in the reactor was:

$$\frac{(\% \text{ of sulphur-containing compounds at inlet} - \% \text{ of sulphur-containing compounds at outlet})}{\% \text{ of sulphur-containing compounds at inlet}} \times 100 =$$

$$\frac{(2.036 - 0.247)}{2.036} \times 100 = 88\%$$

The Claus plant had a yield of 94%
The yield of the Claus plant assembly+finishing unit was:

94+(6×0.88)=99.28

EXAMPLE 2, in accordance with the invention (FIG. 2)

The feed, organic solvent, catalyst and packing were those of Example 1.

The operating conditions for the first reactor-contactor (2) were the same as for Example 1.

The relative conditions for the second reactor-contactor (102) were as follows:
Temperature: 110° C.;
Flow rate of solvent and sulphur (line 104): 500 m³/h;
Flow rate of cooled solvent (line 116): 50 m³/h;
Temperature of cooled solvent: 65° C.;
Temperature of recycled solvent: (line 105): 108° C.;
Recovered sulphur (line 25): 344.3 kg/h.

The compositions of the inlet gas (line 3) and outlet gas to and from the plant are shown in Table II below:

TABLE II

|  | Inlet gas (3) vol % | Outlet gas (20) vol % |
|---|---|---|
| $H_2S$ | 1.234 | 0.126 |
| $SO_2$ | 0.617 | 0.020 |
| $CO_2$ | 4.000 | 4.084 |
| COS | 0.015 | 0.009 |
| $CS_2$ | 0.015 | 0.009 |
| $S_v$* | 0.140 | 0.003 |
| $N_2$ | 59.990 | 61.180 |
| $H_2O$ | 33.990 | 34.670 |
| Sum of sulphur-containing compounds | 2.032 | 0.090 |

*$S_v$ = sulphur vapour + vesicular sulphur.

The yield of sulphur-containing compounds in the reactor was:

$$\frac{(\% \text{ of sulphur-containing compounds at inlet} - \% \text{ of sulphur-containing compounds at outlet})}{\% \text{ of sulphur-containing compounds at inlet}} \times 100 =$$

$$\frac{(2.032 - 0.090)}{2.032} \times 100 = 95.57\%$$

The Claus plant had a yield of 94%
The yield of the Claus plant assembly+finishing unit was:

$$94 + \frac{(6 \times 95.57)}{100} = 99.73$$

EXAMPLE III in accordance with the invention (FIG. 3)

A vertical reactor-contactor composed of two stages through which the gas to be treated passed successively:

Lower stage (2)
The conditions were similar to those of the reactor of Example 1; the gas flow conditions and the composition of the gas to be treated were the same.
However, no catalyst was used in this step.
Upper stage (102)
The operating conditions were strictly the same as those of the reactor (102) of example 2. All of the catalyst was introduced via line (101).

The compositions of the inlet gas (line 3) and outlet gas (line 120) to and from the plant are shown in Table III below:

TABLE III

|  | Inlet gas (3) vol % | Outlet gas (20) vol % |
|---|---|---|
| $H_2S$ | 1.234 | 0.063 |
| $SO_2$ | 0.617 | 0.0315 |
| $CO_2$ | 4.000 | 4.000 |
| COS | 0.015 | 0.006 |
| $CS_2$ | 0.015 | 0.006 |
| $S_v$* | 0.140 | 0.004 |
| $N_2$ | 60.000 | 60.000 |
| $H_2O$ | 34.000 | 34.000 |
| Sum of sulphur-containing compounds | 2.036 | 0.1165 |

*$S_v$ = sulphur vapour + vesicular sulphur.

The yield of sulphur-containing compounds in the reactor was:

$$\frac{(\% \text{ of sulphur-containing compounds at inlet} - \% \text{ of sulphur-containing compounds at outlet})}{\% \text{ of sulphur-containing compounds at inlet}} \times 100 =$$

$$\frac{(2.036 - 0.1165)}{2.036} \times 100 = 94.27\%$$

The Claus plant had a yield of 94%
The yield of the Claus plant assembly+finishing unit was:

$$94 + \frac{(6 \times 94.27)}{100} = 99.65$$

We claim:

1. A process for the treatment of a gas containing hydrogen sulphide and sulphur dioxide in which the gas is brought into contact with at least one organic solvent in a first gas-liquid contact and reaction zone and a gaseous effluent containing water and sulphur vapour is recovered from said first gas-liquid contact and reaction zone, wherein the gaseous effluent is introduced into a second contact zone with at least one recycled organic solvent which is depleted in sulphur, a purified gas substantially no longer containing sulphur vapour is recovered from said second contact zone; at least a portion of a sulphur-rich solvent is removed from the second contact zone, said portion of solvent is cooled to obtain a suspension of sulphur crystals in the solvent, the sulphur crystals are separated from the solvent and said portion of cooled solvent which is depleted in sulphur is recycled at least in part to the second contact zone, and wherein one of the two contact zones contains at least one catalyst to promote a reaction between hydrogen sulphide and sulphur dioxide.

2. A process according to claim 1, in which the remaining portion of the solvent which is rich in sulphur is recycled to spray nozzles of the second contact zone.

3. A process according to claim 1, in which said portion of solvent to be depleted in sulphur is cooled by indirect heat exchange.

4. A process according to claim 1, in which said portion of solvent to be depleted in sulfur is cooled by mixing with a suitable quantity of water, such that a solvent-water mixture containing 30% to 70% by weight of water is obtained.

5. A process according to claim 1, in which said portion of solvent to be depleted in sulphur is cooled to a temperature which is lower than the melting temperature of sulphur.

6. A process according to claim 5, wherein the solvent is cooled to a temperature in the range of 40 to 110° C.

7. A process according to claim 1, in which at least a portion of a single-phase solution of said organic solvent is extracted from the lower portion of the first contact zone, cooled to eliminate at least a portion of the heat of reaction, and recycled to the first contact zone.

8. A process according to claim 1, in which the temperature of the second contact zone is lower than the temperature of the first contact zone.

9. A process according to claim 1, in which the organic solvent of the first contact zone and the organic solvent of the second contact zone are the same solvent.

10. A process according to claim 1, in which the first contact zone contains the catalyst.

11. A process according to claim 1, in which both the gas and organic solvent in the first contact zone and the gaseous effluent and organic solvent in the second contact zone are brought into counter-current contact, the gas supply or the gaseous effluent supply being conducted to the lower portion of the contact zones and the organic solvent supply being conducted to the upper portion of the contact zones.

12. A process according to claim 1, in which both the gas and organic solvent in the first contact zone and the gaseous effluent and organic solvent in the second contact zone are brought into counter-current contact, the gas supply or gaseous effluent supply being conducted to the upper portion of the contact zones along with the supply of organic solvent.

13. The process according to claim 1, wherein the removed sulphur-rich solvent constitutes at most 50% of the flow of said organic solvent.

14. The process according to claim 1, wherein said organic solvent is insoluble in water and is dodecane, tridecane, or naphtha.

15. The process according to claim 1, wherein said organic solvent is water soluble and comprises polyols containing 2 to 15 carbon atoms, with boiling points at atmospheric pressure of more than 200° C.

16. The process according to claim 1, wherein said catalyst is an alkaline salt of an organic acid.

* * * * *

UNITED STATES PATENT AND TRADEMARK OFFICE
CERTIFICATE OF CORRECTION

PATENT NO. : 5,935,547
DATED : August 10, 1999
INVENTOR(S) : Fabrice Lecomte et al.

It is certified that error appears in the above-identified patent and that said Letters Patent is hereby corrected as shown below:

Column 9,
Line 26, after "wherein" insert -- at least --.

Signed and Sealed this

Twelfth Day of February, 2002

Attest:

JAMES E. ROGAN
Attesting Officer  Director of the United States Patent and Trademark Office